United States Patent
Peterson

[11] 3,732,423
[45] May 8, 1973

[54] SHIPPING CONTAINER FOR RADIOACTIVE MATERIAL

[75] Inventor: Reuben W. Peterson, Wilmington, Del.

[73] Assignee: National Lead Company, New York, N.Y.

[22] Filed: May 24, 1971

[21] Appl. No.: 146,010

[52] U.S. Cl. ............................250/108 R, 250/106 R
[51] Int. Cl. ..................................G21f 5/00
[58] Field of Search .................250/106 S, 106 R, 250/108 R

[56] References Cited

UNITED STATES PATENTS 3,466,444  9/1969  Lusk ........................... 250/108 WS
3,488,502  1/1970  Dukes ............................ 250/106 S

*Primary Examiner*—Archie R. Borchelt
*Attorney*—Robert L. Lehman, Fred Floersheimer and Jay D. Gordon

[57] ABSTRACT

A body means includes inner and outer shell means having radiation shielding means therebetween and defining gaps at the interfaces between the shielding means and the shell means. Means is provided in said gaps having a thermal conductivity which is substantially greater than that of air and which inhibits corrosion of the radiation shielding means. Means is also provided for releasing the means in said gaps into the cavity within the body means at a predetermined temperature.

4 Claims, 3 Drawing Figures

PATENTED MAY 8 1973 3,732,423

INVENTOR
REUBEN W. PETERSON

BY

Jay D. Gordon
ATTORNEY

SHIPPING CONTAINER FOR RADIOACTIVE MATERIAL

BACKGROUND OF THE INVENTION

The present invention relates to a new and novel shipping container for radioactive material and more particularly to a shipping container for spent fuel elements utilized in nuclear reactors and the like. The present invention may be employed for shipping any sort of radioactive material but it is especially adapted for shipping irradiated nuclear fuel elements and the like for transport from one location to another on railroad cars, trailers and the like.

A major consideration with such shipping containers is to provide a construction which provides adequate protection against radiation both under normal shipping conditions and further in the event of an accident. The fuel elements carried in a shipping container generate a considerable amount of heat which must be dissipated through the walls of the shipping container. When lead is employed as the radiation shielding means, efficient heat transfer can usually be provided since the lead is poured and bonded to the shipping container wall portions. Any small and unavoidable clearance spaces tend to seriously reduce the rate of flow of heat from the nuclear fuel load to and through the walls of the shipping container. When the shielding means comprises lead, an expansion space is generally provided for the lead in case of accidental fire.

When uranium is employed as the shielding means, it is in the form of uranium castings which presents a serious problem of heat transfer across the interfaces between the inner and outer shell means and the uranium castings.

The uranium castings are fitted as closely as practicable to the shipping container structure but this arrangement is not adequate for heat transfer purposes. The uranium castings have also been precision machined and shrink fitted with the inner and outer shell means of the shipping container. But this is a complicated and expensive procedure and in some cases is not feasible.

In addition, there is an appreciable volume of space not filled with uranium shielding which is a normal design feature to reduce the quantity of uranium required.

SUMMARY OF THE INVENTION

In the present invention, the gaps at the interfaces between the shielding means and the shell means are filled with a means having a thermal conductivity which is substantially greater than that of air to facilitate heat transfer between the shielding means and the shell means, said means in the gaps also serving to inhibit corrosion of the uranium radiation shielding means. Accordingly, the means filling said gaps serves a dual function in enhancing heat transfer and further serves the important function of preventing corrosion and oxidation of the uranium. The presence of helium as this means at a uranium filled weldment prevents corrosion or reaction with oxygen or moisture associated with unpurged weldments. The helium means can also be released to the container cavity in case of loss of normal coolant to prevent overheating of the fuel elements therein.

The means filling said gaps may comprise either a solid material or a gas. In the event a solid material is employed, the material is preferably of the type which can be melted so as to fill said gaps in a molten state, the material expanding upon solidification from the molten state so as to insure that the gaps are completely filled with the desired material.

The gaps may also be filled with a gas which can be employed either at atmospheric pressure or at elevated pressures. The gas may also be employed for a further useful purpose. When an accident occurs, the water coolant may be lost from the shipping container, and under these conditions the heat generated in the fuel rods within the container will cause the rods to reach temperatures exceeding 1,000° F. At this temperature, the integrity of the fuel with respect to containment of the radioactive gases in the fuel rods is questionable. In order to prevent this situation from arising, the container may also employ a construction for releasing the gas from said gaps into the cavity within which the radioactive material is carried so as to fill the cavity with the gas as the water coolant is lost.

The gas is normally retained in the gaps by a suitable plug means formed of a fusible alloy or the like which is adapted to release the gas into the cavity at a predetermined temperature which will occur only under accidental conditions or upon malfunction of the cooling system. The gas escaping into the cavity will surround the fuel and since it is a much better thermal conductor than water vapor or air, the heat will be more effectively conducted from the fuel elements to the inner shell means of the shipping container and prevent the fuel elements from overheating. The gas accordingly serves the triple function of normally reducing the temperature drop across the interfaces between the shielding means and the shell means, reducing the corrosion of uranium and further reducing the temperature of the fuel under emergency or accident conditions.

DESCRIPTION OF THE PREFERRED EMBODIMENTS

Figure 1:
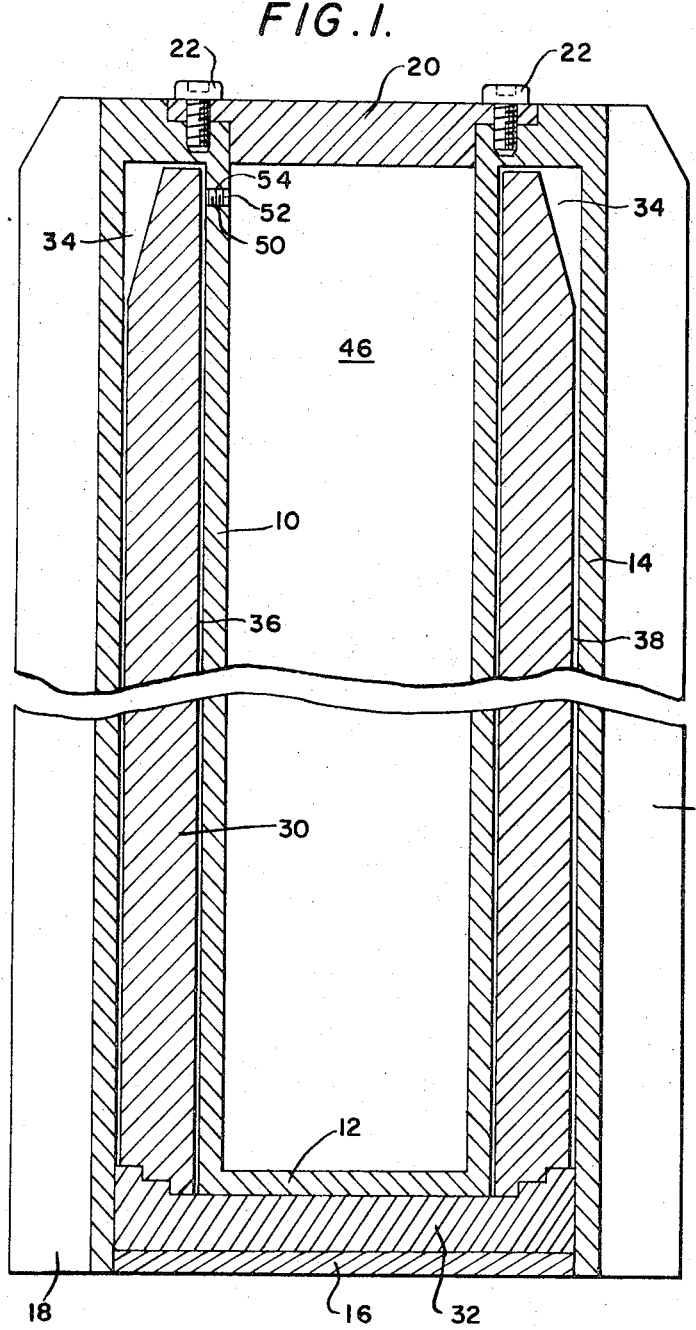
FIG. 1 is a vertical longitudinal section through a shipping container according to the present invention.
Figure 2:
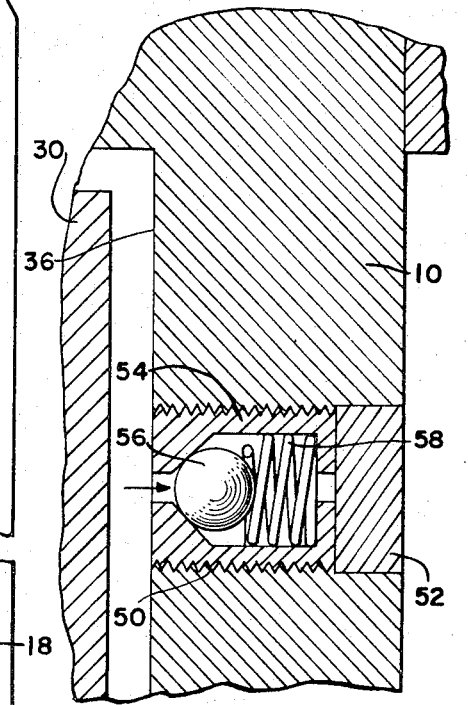
FIG. 2 is an enlarged sectional view of a portion of the structure shown in FIG. 1.

Referring now to the drawing wherein like reference characters designate corresponding parts throughout the several views, a first form of the invention is shown in FIGS. 1 and 2 of the drawing wherein the shipping container includes an inner shell means 10 having a bottom 12 and an outer shell means 14 having a bottom 16, the inner and outer shell means being formed of a suitable material such as stainless steel or the like. A plurality of cooling fins 18 are connected to the outer surface of the outer shell means. A closure means or a head 20 is provided at one end of the container and is held in place by a plurality of cap screws 22 passing through suitable openings provided in the closure means and being threaded into suitable threaded holes provided in the body means of the shipping container.

Radiation shielding means includes one or more uranium castings 30 in the space between the inner and outer shell means and a further uranium casting 32 between the bottoms of the inner and outer shell means, uranium castings 30 and 32 having a suitable joint therebetween to prevent radiation beaming along the interfaces therebetween. An annular void or gap 34 may be provided between the radiation shielding means and the outer shell means adjacent the closure means because of reduced radiation in this area, and further gaps 36 and 38 are usually encountered at the interfaces between the radiation shielding means and the inner shell means and outer shell means respectively.

All of these gaps are filled with a means having a thermal conductivity which is substantially greater than that of air so as to facilitate heat transfer between the shielding means and the shell means, the means filling the gaps also serving to inhibit corrosion of the uranium radiation shielding means. In FIGS. 1 and 2, the means filling said gaps may comprise a gas such as helium, this gas being either under atmospheric or elevated pressures as desired.

When a gas such as helium is disposed within said gaps at elevated pressures, means may also be provided for automatically releasing gas into the central cavity 46 defined within the body means under accidental conditions or cooling system malfunction when the temperature in the cavity within the shipping container reaches a predetermined point above normal operating temperatures.

A threaded hole 50 is provided through the inner shell means 10, and a fusible plug 52 formed of a suitable material such as a lead-bismuth alloy is provided at the inner end of this hole and faces the interior of the cavity so as to be subjected to the temperature within the cavity. In the case where the normal operating temperature within the cavity of the shipping container is approximately 350°F, plug 52 may be of such a nature as to melt at a temperature of approximately 450°F.

A one-way check valve 54 is threaded within threaded hole 50 or is otherwise attached to the inner shell means and includes a ball-check member 56 normally urged in one direction by a compression spring 58 so as to permit the flow of gas only in the direction indicated by the arrow in FIG. 2 and control the rate of flow.

It is apparent that the construction as shown in FIGS. 1 and 2 will automatically enable available excess gas to be released from the pressurized space between the radiation shielding and the shell means into the cavity of the container when the temperature rises above a predetermined level as will occur under accident or emergency conditions, thus replacing normal coolant and preventing overheating of the fuel elements while still maintaining adequate heat transfer across gaps at the interfaces.

Figure 3:
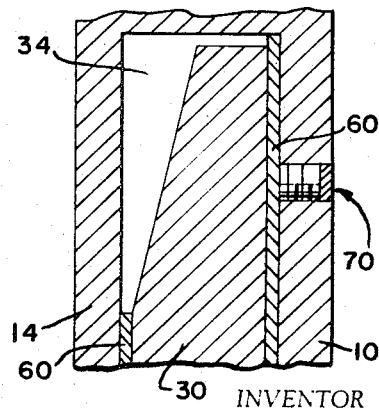
FIG. 3 is an enlarged sectional view illustrating a modified form of the invention.

Referring now to FIG. 3, a modification of the invention as illustrated wherein the gaps encountered at the interfaces between the radiation shielding means and the inner shell and outer shell means respectively are filled by bodies of solid material 60 such as lead-bismuth alloy which is melted and placed into said gaps in a molten state whereupon the material is allowed to cool and expand upon solidification from the molten state. This solid material also has a thermal conductivity which is substantially greater than that of air and will inhibit corrosion of the uranium shielding means. Void or gap 34 is filled with a gas such as helium and a fusible plug and check valve assembly indicated generally by reference character 70 identical to the assembly previously described is provided in the inner shell means for a similar purpose.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A shipping container for radioactive material comprising body means defining a radioactive material receiving cavity therewithin, said body means including inner shell means, outer shell means spaced from said inner shell means and defining a space therebetween, uranium cast radiation shielding means disposed in said space and forming gaps at the interfaces between the shielding means and said shell means, material substantially filling said gaps having a thermal conductivity which is substantially greater than that of air to facilitate heat transfer between said shielding means and said shell means, and pressure sensitive means arranged in said inner shell means for venting said conductive material into said receiving cavity upon the attainment of a predetermined pressure within said gaps, said conductive material capable of cooling radioactive material and inhibiting corrosion of said radiation shielding means.

2. A shipping container as defined in claim 1 wherein the means in said gaps is a gas.

3. A shipping container as defined in claim 2 wherein said gas comprises helium.

4. A shipping container as defined in claim 1 wherein said releasing means includes ball valve means for controlling the flow of the means in said gaps into said cavity.

* * * * *